United States Patent
Lee et al.

(10) Patent No.: US 10,601,056 B2
(45) Date of Patent: Mar. 24, 2020

(54) HEAT TREATMENT METHOD FOR MEMBRANE ELECTRODE ASSEMBLY FOR FUEL CELL

(71) Applicants: HYUNDAI MOTOR COMPANY, Seoul (KR); KIA MOTORS CORPORATION, Seoul (KR)

(72) Inventors: Woo Jin Lee, Seoul (KR); Yong Min Kim, Seongnam-si (KR); Min Kyung Kim, Yongin-si (KR); Ki Sub Lee, Yongin-si (KR); Min Jin Kim, Seoul (KR)

(73) Assignees: Hyundai Motor Company, Seoul (KR); Kia Motors Corporation, Seoul (KR)

( * ) Notice: Subject to any disclaimer, the term of this patent is extended or adjusted under 35 U.S.C. 154(b) by 201 days.

(21) Appl. No.: 15/694,131

(22) Filed: Sep. 1, 2017

(65) Prior Publication Data

US 2018/0175407 A1    Jun. 21, 2018

(30) Foreign Application Priority Data

Dec. 20, 2016    (KR) .......................... 10-2016-0174276

(51) Int. Cl.
| | | |
|---|---|---|
| *H01M 8/0297* | (2016.01) | |
| *H01M 8/1086* | (2016.01) | |
| *H01M 8/1004* | (2016.01) | |
| *H01M 8/1018* | (2016.01) | |

(52) U.S. Cl.
CPC ....... *H01M 8/0297* (2013.01); *H01M 8/1004* (2013.01); *H01M 8/109* (2013.01); *H01M 8/1018* (2013.01); *H01M 8/1093* (2013.01); *H01M 2008/1095* (2013.01); *H01M 2250/20* (2013.01); *Y02E 60/521* (2013.01); *Y02P 70/56* (2015.11)

(58) Field of Classification Search
CPC .. H01M 8/109; H01M 8/0297; H01M 8/1004; H01M 8/1018
See application file for complete search history.

(56) References Cited

U.S. PATENT DOCUMENTS

| | | | | |
|---|---|---|---|---|
| 9,425,476 B2 * | 8/2016 | Lee | ...................... | B32B 29/002 |
| 2003/0175569 A1 * | 9/2003 | Inagaki | .................... | C25B 9/10 |
| | | | | 429/480 |
| 2009/0255632 A1 * | 10/2009 | Park | ...................... | B32B 39/00 |
| | | | | 156/353 |
| 2010/0136456 A1 * | 6/2010 | Sugawara | ........... | H01M 8/0276 |
| | | | | 429/479 |
| 2013/0306237 A1 * | 11/2013 | Nagasaka | ................. | B30B 3/04 |
| | | | | 156/285 |

FOREIGN PATENT DOCUMENTS

| | | |
|---|---|---|
| KR | 10-2015-0071889 A | 6/2015 |
| KR | 10-2016-0056028 A | 5/2016 |

* cited by examiner

*Primary Examiner* — Matthew J Merkling
(74) *Attorney, Agent, or Firm* — Morgan, Lewis & Bockius LLP

(57) ABSTRACT

A heat treatment method for a membrane electrode assembly (MEA) of a fuel cell includes: placing a power supply plate on a surface of the MEA or on a surface of an assembly of the MEA and a gas diffusion layer (GDL); and performing heat treatment on a surface or interior of the power supply plate by applying power to the power supply plate.

9 Claims, 6 Drawing Sheets

[ Cross section along A-A' ]

[ Cross section along B-B' ]

- Power supply plate
- Heat generation portion
- Occurrence of spark (Pulse used)

[ Cross section along C-C' ]

HEAT TREATMENT METHOD FOR MEMBRANE ELECTRODE ASSEMBLY FOR FUEL CELL

CROSS-REFERENCE TO RELATED APPLICATION

This application claims under 35 U.S.C. § 119(a) the benefit of priority to Korean Patent Application No. 10-2016-0174276 filed on Dec. 20, 2016, the entire content of which is incorporated herein by reference.

TECHNICAL FIELD

The present disclosure relates to a heat treatment method and apparatus for a membrane electrode assembly for a fuel cell, and more particularly, to a heat treatment method for a membrane electrode assembly for improving durability of the membrane electrode assembly and a heat treatment apparatus for performing the same.

BACKGROUND

Fuel cells are power generation systems that convert chemical energy of a fuel into electrical energy by an electrochemical reaction in a stack without converting the chemical energy into heat by combustion.

Such a fuel cell may not only supply electric power for industrial use, domestic use and vehicle driving, but also be applied to power supply of small electric/electronic products, especially portable devices.

Currently, a polymer electrolyte membrane fuel cell (PEMFC), also known as a proton exchange membrane fuel cell, is used as a power source for vehicle driving.

The PEMFC has a lower operating temperature, higher efficiency, higher current density and output density, shorter startup time, and faster response to load change than other types of fuel cells, and is thus widely usable as a power source for portable devices.

The PEMFC includes a membrane electrode assembly (MEA) formed by attaching catalyst electrode layers, on which an electrochemical reaction occurs, to both sides of a polymer electrolyte membrane, through which hydrogen ions are moved, a gas diffusion layer (GDL) serving to distribute the reaction gases evenly and transfer the generated electric energy, a gasket and a fastening mechanism for maintaining airtightness of the reaction gases and the cooling water and a proper fastening pressure, and a bipolar plate for moving the reaction gases and the cooling water.

Further, a fuel cell system applied to a fuel cell vehicle includes a fuel cell stack for generating electrical energy from an electrochemical reaction of reaction gases (hydrogen as a fuel and oxygen as an oxidizer), a hydrogen supply apparatus for supplying hydrogen to the fuel cell stack as a fuel, an air supply apparatus for supplying air containing oxygen to the fuel cell stack, a heat and water management system for controlling the operation temperature of the fuel cell stack and performing a water management function, and a fuel cell controller for controlling the overall operation of the fuel cell system.

In a typical fuel cell system, the hydrogen supply apparatus includes a hydrogen storage (hydrogen tank), a regulator, a hydrogen pressure control valve, and a hydrogen recirculation device, and the air supply apparatus includes an air blower and a humidifier. The heat and water management system includes a coolant pump, a water tank, and a radiator.

FIG. 1 illustrates a procedure of fabricating a typical GDL-MEA assembly. As shown in FIG. 1, a membrane electrode assembly (MEA) is fabricated by forming electrodes (cathode, anode) on both surfaces of an electrolyte membrane and then attaching sub gasket films.

The MEA prepared in this way is subjected to heat treatment through thermocompression to enhance durability. The heat-treated MEA has a high durability but exhibits degraded performance due to deterioration thereof.

As shown in FIG. 1, gas diffusion layers (GDLs) are bonded to both sides of the completed MEA. The body obtained through bonding as shown in FIG. 1 is referred to as a GDL-MEA assembly. Bonding methods for GDL-MEA include using thermocompression and using an adhesive. However, thermocompression bonding may not be applicable depending on the material or process of the MEA. When an adhesive is used, product yield is problematic.

SUMMARY OF THE DISCLOSURE

The present disclosure has been made in an effort to solve the above-described problems associated with the related art, and as a result, the present disclosure provides a heat treatment method and apparatus for a membrane electrode assembly which may secure durability of the membrane electrode assembly and prevent performance degradation from occurring due to deterioration thereof by performing heat treatment on the membrane electrode assembly under different conditions according to physical properties of the respective components of the membrane electrode assembly.

According to an exemplary embodiment of the present disclosure, a heat treatment method for a membrane electrode assembly (MEA) for a fuel cell includes placing a power supply plate on a surface of an MEA or on a surface of an assembly of the MEA and a gas diffusion layer (GDL), and performing heat treatment on a surface or interior of the power supply plate by applying power to the power supply plate.

The power supply plate may be disposed on the MEA and heat treatment may be performed on an electrode portion of the MEA by applying a direct current (DC) power or a DC pulse power to the MEA.

The power supply plate may be disposed on the MEA and heat treatment is performed on an electrolyte membrane of the MEA by applying an alternating current (AC) power to the MEA.

The power supply plate may be disposed on the assembly of the MEA and the GDL and heat treatment may be performed on an interface between the MEA and the GDL by applying an alternating current (AC) pulse power to the assembly of the MEA and the GDL.

The power supply plate may be a power supply plate for a press operation and apply the power to the surface of the MEA or the assembly of the MEA and the GDL while pressing the surface.

The power supply plate may include a first conductive portion arranged at a center thereof, a pair of insulating portions arranged on both sides of the first conductive portion and a second conductive portion disposed on an outer side of the pair of insulating portions, wherein the first conductive portion and the second conductive portion may be configured to apply different kinds of power to perform heat treatment at different positions.

Heat treatment may be performed on one of an electrode portion of the MEA, an electrolyte membrane, and an interface between the GDL and the MEA by the power applied through the first conductive portion, wherein heat treatment may be performed on one of the electrode portion, the electrolyte membrane, and the interface by the power applied through the second conductive portion, except for the one subjected to the heat treatment by the power applied through the first conductive portion.

According to an exemplary embodiment of the present disclosure, a heat treatment apparatus for a membrane electrode assembly (MEA) for a fuel cell includes a first electrical conduction press disposed to press the MEA or an assembly of the MEA and the gas diffusion layer (GDL), a feeder configured to feed the MEA or the assembly of the MEA and the GDL to the first electrical conduction press, and a power supply configured to apply power to the first electrical conduction press, wherein heat treatment is performed on a surface or interior of the MEA or the assembly of the MEA and the GDL by applying power to the MEA or the assembly of the MEA and the GDL.

The first electrical conduction press may include a power supply plate for a press operation, the power supply plate being configured to contact an object to be pressed, wherein the power supply plate may apply the power applied by the power supply to the surface of the MEA or the assembly of the MEA and the GDL while pressing the surface.

The power supply plate may include a first conductive portion arranged at a center thereof, a pair of insulating portions arranged on both sides of the first conductive portion, and a second conductive portion disposed on an outer side of the pair of insulating portions, wherein the first conductive portion and the second conductive portion may be configured to apply different kinds of power to perform heat treatment at different positions.

The feeder may be a roll-to-roll type feeder and include a feed roller and a winding roller.

The feeder may further include one or more buffer rollers movable to maintain tension.

The heat treatment apparatus may further include a cutter configured to cut the MEA or the assembly of the MEA and the GDL heat-treated by the first electrical conduction press into a predetermined size.

The heat treatment apparatus may further include a transfer unit configured to transfer the MEA cut by the cutter or the assembly of the MEA and the GDL cut by the cutter.

The heat treatment apparatus may further include a second electrical conduction press configured to press the MEA or the assembly of the MEA and the GDL transferred by the transfer unit, and a second power supply configured to apply power to the second electrical conduction press, wherein heat treatment may be performed on the MEA or the assembly of the MEA and the GDL by applying the power to the second electrical conduction press.

The feeder may include a transfer robot arm.

Other aspects and embodiments of the disclosure are discussed infra.

It is understood that the term "vehicle" or "vehicular" or other similar term as used herein is inclusive of motor vehicles in general such as passenger automobiles including sports utility vehicles (SUV), buses, trucks, various commercial vehicles, watercraft including a variety of boats and ships, aircraft, and the like, and includes hybrid vehicles, electric vehicles, plug-in hybrid electric vehicles, hydrogen-powered vehicles and other alternative fuel vehicles (e.g. fuels derived from resources other than petroleum). As referred to herein, a hybrid vehicle is a vehicle that has two or more sources of power, for example both gasoline-powered and electric-powered vehicles.

The above and other features of the invention are discussed infra.

BRIEF DESCRIPTION OF THE DRAWINGS

The above and other features of the present disclosure will now be described in detail with reference to certain exemplary embodiments thereof illustrated in the accompanying drawings which are given hereinbelow by way of illustration only, and thus are not limitative of the present disclosure, and wherein:

FIG. 12a is a plan view and FIG. 12b is a cross-sectional view taken along line C-C'.

Figure 1:
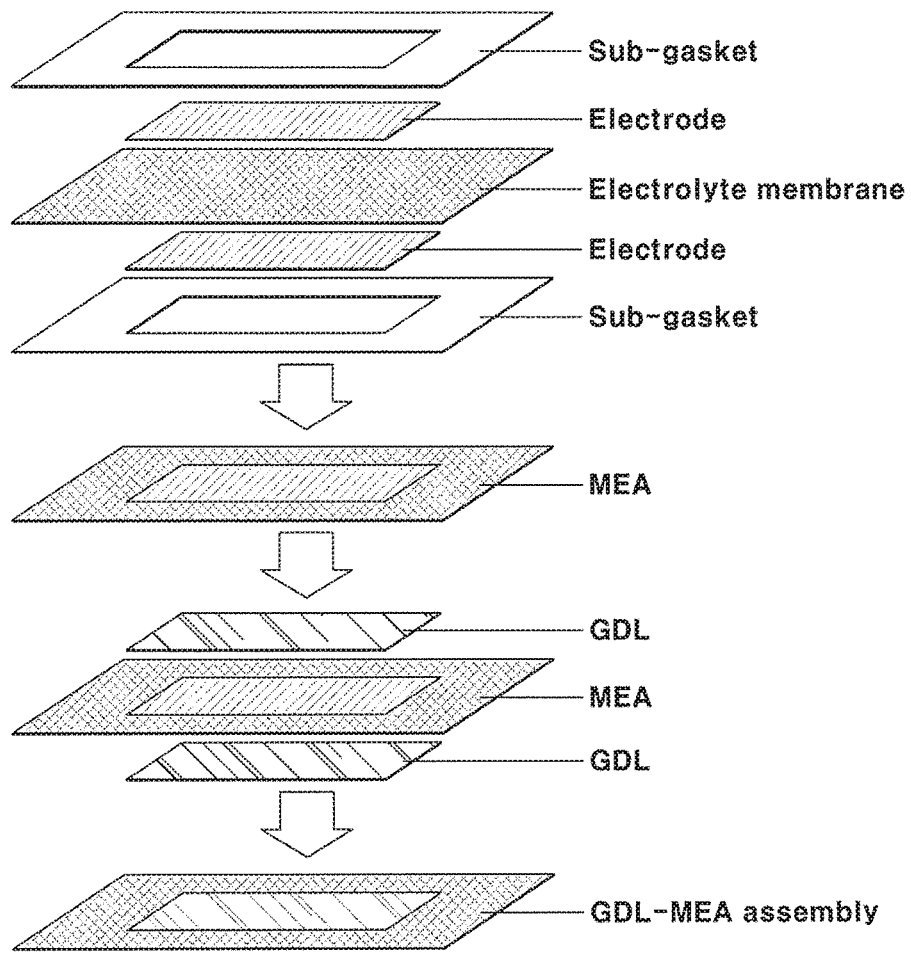
FIG. 1 illustrates a procedure of fabricating a typical GDL-MEA assembly.

It should be understood that the appended drawings are not necessarily to scale, presenting a somewhat simplified representation of various features illustrative of the basic principles of the invention. The specific design features of the present disclosure as disclosed herein, including, for example, specific dimensions, orientations, locations, and shapes, will be determined in part by the particular intended application and use environment.

In the figures, reference numbers refer to the same or equivalent parts of the present disclosure throughout the several figures of the drawing.

DETAILED DESCRIPTION

Hereinafter, the exemplary embodiments of the present disclosure will be described in detail with reference to the accompanying drawings to allow those skilled in the art to easily practice the present disclosure.

Advantages and features of the present disclosure and methods for achieving the same will be clearly understood with reference to the following detailed description of embodiments in conjunction with the accompanying drawings.

However, the present disclosure is not limited to the embodiments disclosed herein, but may be implemented in various different forms. The embodiments are merely examples, and the present disclosure should be defined by the scope of claims.

In addition, in the description of the present disclosure, a detailed description of related known technologies and the like will be omitted when it is judged to make the subject of the present disclosure unclear.

The present disclosure provides a technology for effectively performing heat treatment between respective components in manufacturing a membrane electrode assembly (MEA) applied to a fuel cell and a GDL-MEA formed by bonding the MEA with a gas diffusion layer (GDL).

Particularly, in the present disclosure, different heat treatment conditions are applied according to objects inside and outside of the MEA which are to be heat-treated in performing heat treatment on each constituent of the GDL-MEA. In addition, different heat treatment conditions are processed in a single process, if possible, so as to simplify the process. In the present specification, the membrane electrode assembly is also referred to as an MEA. In this specification, the gas diffusion layer is also referred to as a GDL, and accordingly the assembly of the membrane electrode assembly and the gas diffusion layer may be referred to as a GDL-MEA or GDL-MEA assembly, which has the same meaning.

Hereinafter, a heat treatment method and apparatus for a membrane electrode assembly for a fuel cell according to an exemplary embodiment of the present disclosure will be described in detail with reference to the accompanying drawings.

Figure 2A:
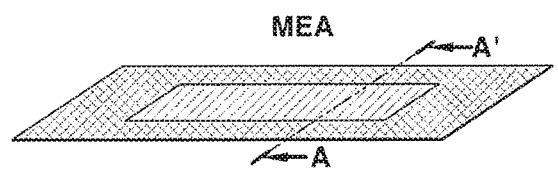
FIG. 2a is a perspective view illustrating the structure of an MEA for a fuel cell.
Figure 2B:
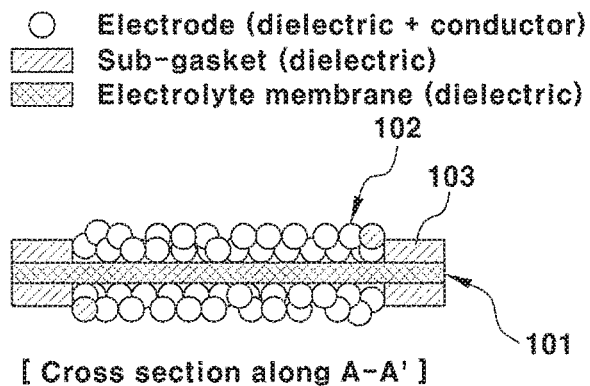
FIG. 2b is a cross-sectional view taken along line A-A' in FIG. 2A.

FIG. 2a is a perspective view illustrating the structure of an MEA for a fuel cell, and FIG. 2B is a cross-sectional view taken along line A-A' in FIG. 2a.

FIG. 2a shows a membrane electrode assembly (MEA) before being bonded to gas diffusion layers (GDLs) in FIG. 1. As shown in FIG. 2b, an MEA has an electrolyte membrane 101 as a dielectric and an electrode portion 102 including a dielectric and a conductor, and also has a sub-gasket 103, which is a dielectric positioned at the edge as shown in FIGS. 2a and b.

Figure 3A:
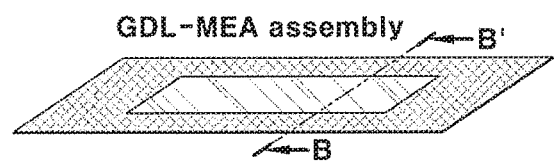
FIG. 3a is a perspective view illustrating the structure of a GDL-MEA for a fuel cell.
Figure 3B:
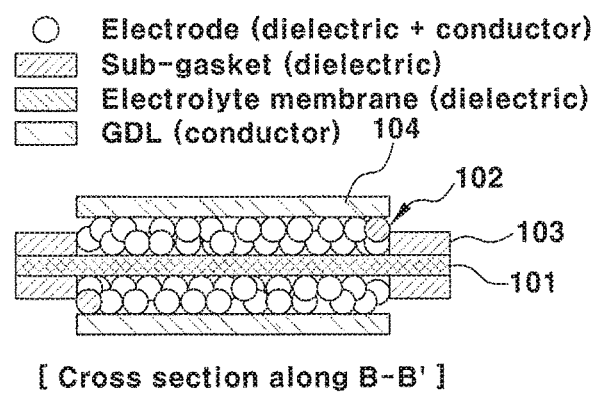
FIG. 3b is a cross-sectional view taken along line B-B' in FIG. 2A.

FIGS. 3a and 3b show the structure of a GDL-MEA assembly formed by bonding a GDL and an MEA.

The structure of FIGS. 3a and 3b is formed by bonding GDLs 104 onto the MEA of FIG. 2a. Therefore, as shown in FIG. 3b, the cross-section of the structure is a stack structure formed by stacking the GDL 104, which is a conductor, on the electrode portion 102.

In an exemplary embodiment of the present disclosure, a power supply plate P is disposed on the surface of the MEA having the cross-sectional structure as shown in FIG. 2a or the GDL-MEA having the cross-sectional structure as shown in FIG. 3b, and power is applied to the power supply plate P to perform heat treatment on the surface or inside of the plate.

However, in terms of improvement in durability and prevention of deterioration, different heat treatment conditions depending on the portion to be subjected to heat treatment may be applied. Accordingly, in an exemplary embodiment of the present disclosure, heat treatment is performed in a different manner depending on the position at which heat treatment is to be performed.

Specifically, in this embodiment, the portions required to be heat-treated are divided into the electrode portion 102 of the MEA, the electrolyte membrane of the MEA, and the interface between the GDL 103 and the MEA, and a different heat treatment method is specified for each of the portions.

Hereinafter, the heat treatment method for each portion will be described.

Figure 4:
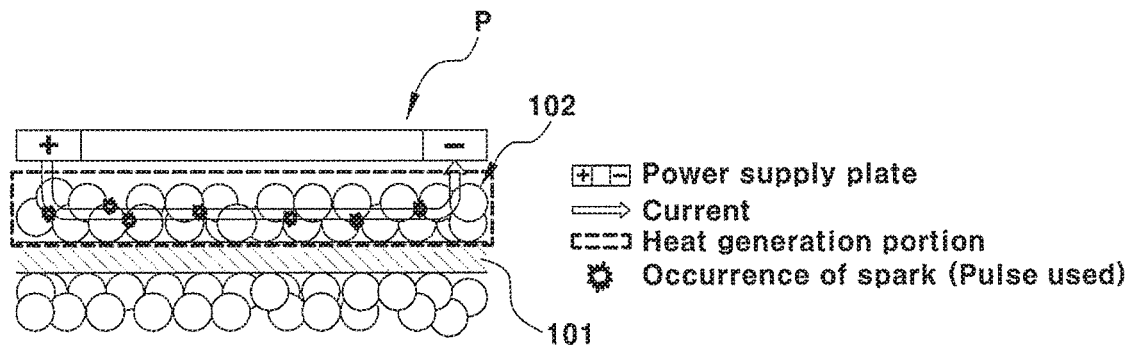
FIG. 4 is a conceptual diagram illustrating heat treatment of the exterior (electrode portion) of an MEA.
Figure 5:
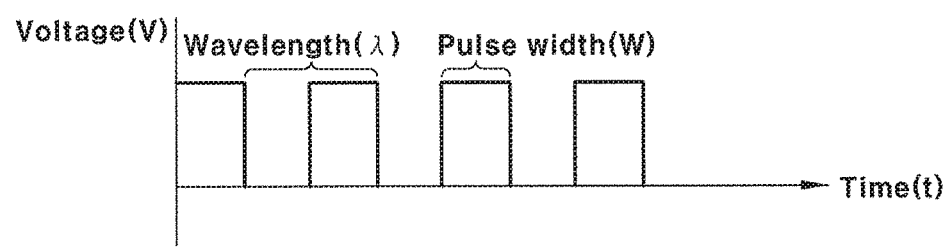
FIG. 5 illustrates direct current (DC) pulse power applied during heat treatment of the exterior (electrode portion) of an MEA.

FIG. 4 is a conceptual diagram illustrating heat treatment of the exterior (electrode portion) of the MEA, and FIG. 5 illustrates direct current (DC) pulse power applied during heat treatment of the exterior (electrode portion) of the MEA. Herein, the exterior of the MEA refers to the electrode portion 102, unless specified otherwise, and the interior of the membrane electrode assembly refers to the electrolyte membrane 101, unless specified otherwise.

In performing heat treatment of the electrode portion 102, according to the present disclosure, a DC power or a DC pulse power is used to sinter the electrode portion. Generation of heat from a conductor, through which a constant current flows, is called Joule heating, and the calorific value (Q) of Joule heating is given by the following equation.

$Q = I^2 Rt$ (Q: calorific value, I: current, R: resistance, t: time)

When a direct current is used, the electrode heat treatment is performed through Joule heating. On the other hand, when a pulse DC is used, an additional sintering effect is caused by sparks occurring at the boundary between electrode particles as shown in FIG. 4. FIG. 5 shows a voltage of the DC pulse power source. The heat treatment conditions may be set differently according to the specifications of the membrane electrode assembly, and may be changed by adjusting the duty ratio, the voltage magnitude, and the like. Unlike FIG. 5, a DC power may be applied.

In an exemplary embodiment of the present disclosure, the power supply plate P made of a conductor is disposed on the MEA to allow power to be applied to the MEA. The power supply plate P is connected to a DC power source or a pulse DC power source so as to perform heat treatment on the electrode portion 102 of the MEA.

Figure 6:
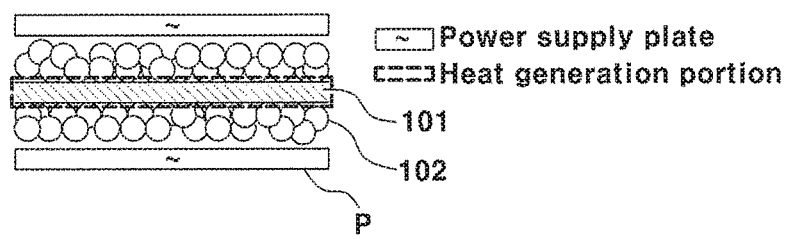
FIG. 6 is a conceptual diagram illustrating heat treatment of the interior (electrolyte membrane) of an MEA.
Figure 7:
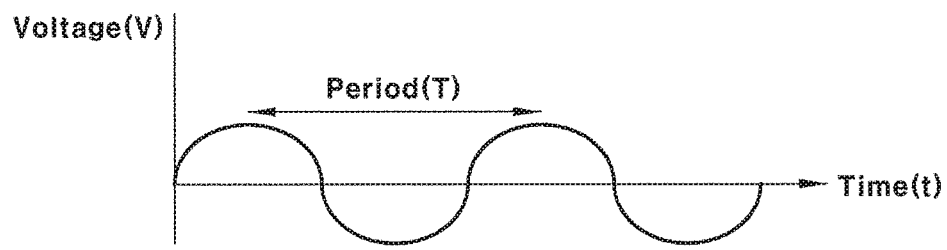
FIG. 7 illustrates alternating current (AC) power applied during heat treatment of the interior (electrolyte membrane) of an MEA.

FIG. 6 is a conceptual diagram illustrating heat treatment of the interior (electrolyte membrane) of the MEA, and FIG. 7 illustrates an (AC) power applied during heat treatment of the interior (electrolyte membrane) of the MEA.

To perform heat treatment on the interior of the MEA, that is, the electrolyte membrane 101, the present disclosure proposes a heat treatment method using an AC power source. When an AC voltage is applied to a dielectric, the dielectric material vibrates according to the electric field, and the vibration is converted into heat. That is, when the AC power having a frequency corresponding to the resonance frequency of the electrolyte membrane is supplied to both surfaces of the electrolyte membrane, the electrolyte membrane is heated. As a result, the heat treatment is concentrated at the electrolyte membrane and the electrolyte membrane-electrode interface.

The power supply plate P is disposed on the MEA as shown in FIG. 6, and the electrolyte membrane 101 is heat-treated by applying an AC power shown in FIG. 7 to the MEA.

At this time, the power application conditions may be changed according to the specifications of the MEA. In addition, the frequency (1/period) of the AC power is set to the resonance frequency of the electrolyte membrane 101 in order to heat the electrolyte membrane 101, as described above.

Figure 8:
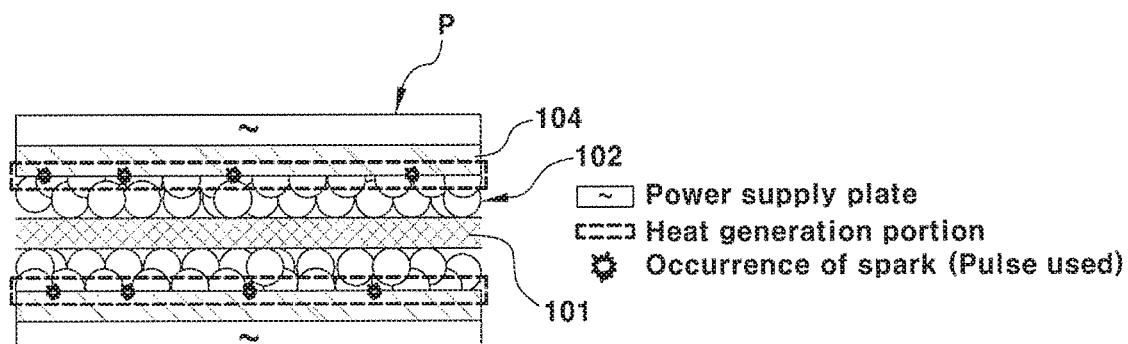
FIG. 8 is a conceptual diagram illustrating heat treatment of the interface of the GDL-MEA.
Figure 9:
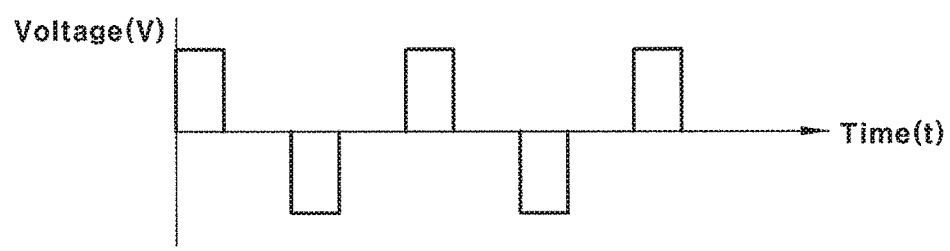
FIG. 9 illustrates AC pulse power applied during heat treatment of the interface of the GDL-MEA.

FIG. 8 is a conceptual diagram illustrating heat treatment of the interface of the GDL-MEA, and FIG. 9 illustrates an AC pulse power applied during heat treatment of the interface of the GDL-MEA.

According to the present disclosure, an AC pulse power is used to perform bonding of the GDL-MEA interface. A voltage of an AC pulse higher than or equal to a breakdown voltage is applied between the GDL and the MEA electrode portion. As a result, local bonding occurs as a spark occurs at the interface between the GDL and the MEA electrode. At this time, the charge supplied from one pulse is determined by the capacitance of the electrode. The charge supplied from one pulse is set to be less than or equal to the capacitance of the MEA.

As shown in FIG. 8, to perform heat treatment of the GDL-MEA interface, an AC pulse power is applied to the assembly of the MEA and the GDL 103 with the power electrode plate P disposed on the assembly of the MEA and the GDL 103.

At this time, as an AC voltage higher than or equal to the breakdown voltage as shown in FIG. 9 is applied, bonding occurs with a spark generated in a part of the interface as shown in FIG. 8.

Another feature of the present disclosure is that at least a part of the above-described different heat treatment processes are performed simultaneously.

Figure 10:
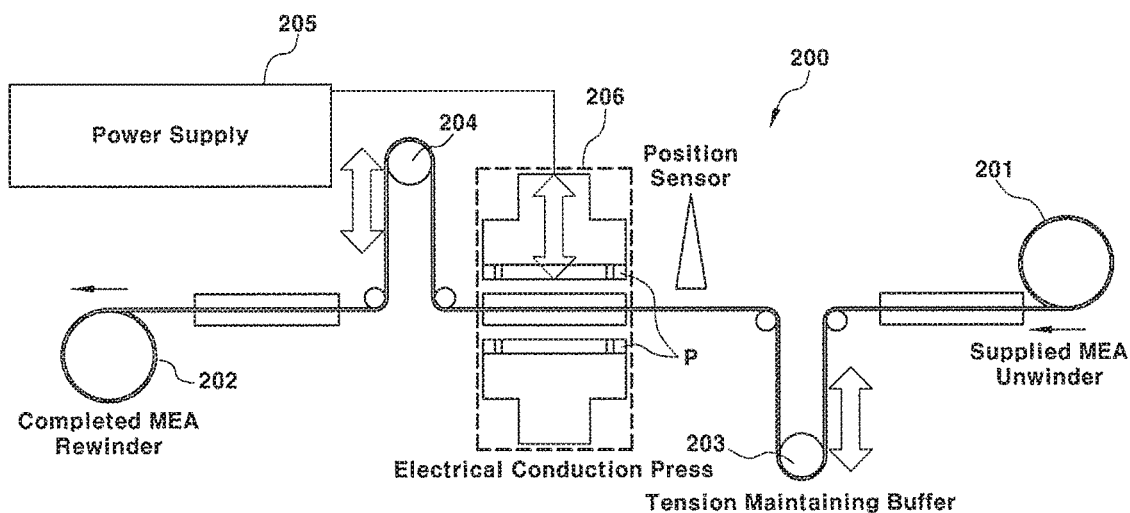
FIG. 10 illustrates a roll-to-roll type manufacturing apparatus according to an exemplary embodiment of the present disclosure.
Figure 11:
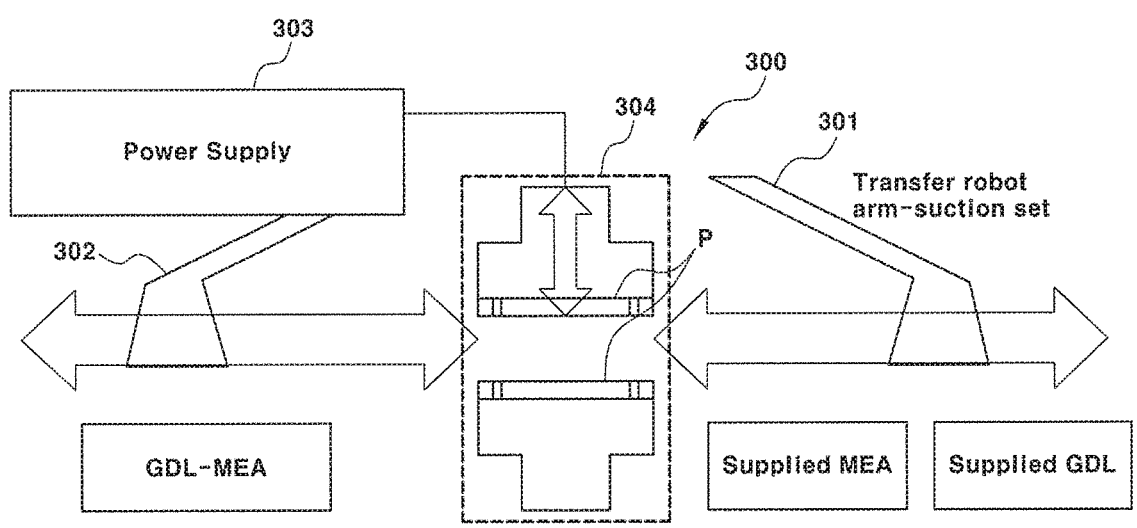
FIG. 11 illustrates a sheet type manufacturing apparatus according to another exemplary embodiment of the present disclosure.

The manufacturing apparatus for this method is shown in FIGS. 10 to 12.

Specifically, FIG. 10 illustrates a manufacturing apparatus of a roll-to-roll type according to an exemplary embodiment of the present disclosure, FIG. 11 illustrates a sheet type manufacturing apparatus according to another exemplary embodiment of the present disclosure, and FIG. 12 illustrates a structure of a press power supply plate according to an exemplary embodiment of the present disclosure.

The roll-to-roll type manufacturing apparatus of FIG. 10 and the sheet type manufacturing apparatus of FIG. 11 may be separately applied, or the two apparatuses may be installed in series.

For example, an MEA fabricated in the roll-to-roll type manufacturing apparatus of FIG. 10 may be moved to the sheet type manufacturing apparatus of FIG. 11, and then, a subsequent process may be performed by the apparatus of FIG. 11.

In the roll-to-roll method, a raw material is wound in a roll shape and supplied along a specific path, and the processed product is wound into a roll and stored. As shown in FIG. 10, the MEA rolled in a film form is supplied from the supply side. The supplied MEA passes through an electrical conduction press 206 arranged in the middle. When the position sensor confirms that the MEA is in place, the electrical conduction press will press both sides of the MEA. During processing by the electrical conduction press, transfer of the material is stopped, and the tension acting on the material is kept constant for a period between stop and restart of transfer. The processed product is moved along the path again and wound and stored.

Specifically, as the MEA is fabricated using a roll-to-roll method, the apparatus of FIG. 10 includes a feeder having a feed roller 201 on the supply side for feeding an initial MEA and a winding roller 202 for winding the MEA upon which the heat treatment is completed.

In addition, an electrical conduction press 206 for heat treatment is provided between the feed roller 201 and the winding roller 202. The electrical conduction press 206 serves to press the MEA or the assembly of the MEA and the GDL. In addition, the roll-to-roll type manufacturing apparatus according to this embodiment includes a power supply 205 for supplying power to the electrical conduction press 206.

The power supply 205 supplies power to the MEA disposed on the electrical conduction press 206 or the assembly of the MEA and the GDL. By the power supply 205, heat treatment is performed on the surface of the MEA, the interior of the MEA, or the interface of the GDL-MEA.

The electrical conduction press 206 includes a power supply plate P for press contact with an object to be pressed, and the power supply plate P for press applies power to the surface of the MEA or the assembly of the MEA and the GDL, while pressing the surface.

Figure 12A:
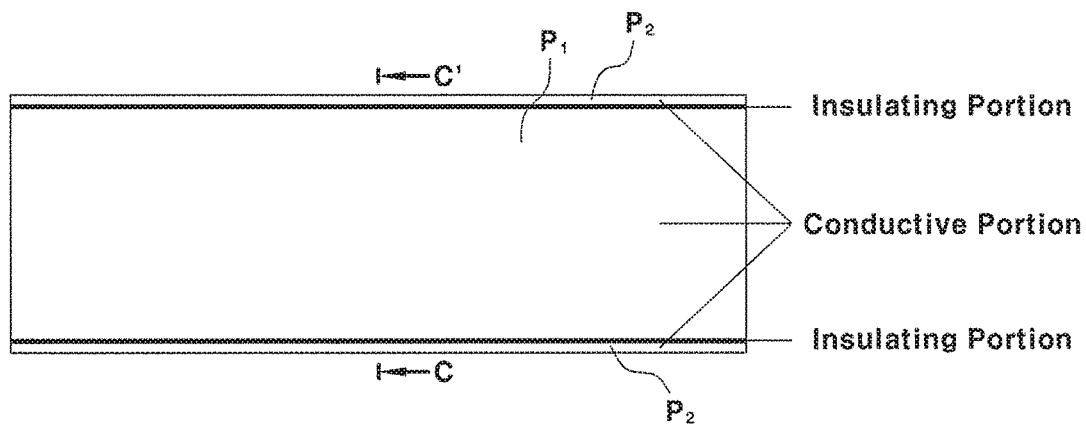
FIGS. 12a and 12b illustrate a structure of a press power supply plate according to an exemplary embodiment of the present disclosure, where
Figure 12B:
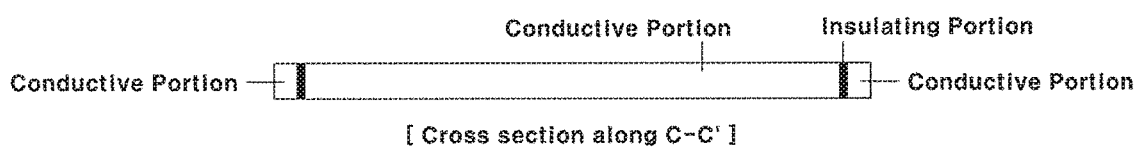

In an exemplary embodiment of the present disclosure, a power supply plate for the press operation having a structure as shown in FIGS. 12a and 12b is provided such that different heat treatment processes may be performed simultaneously.

Specifically, the power supply plate for the press operation includes a first conductive portion $P_1$ arranged at the center, a pair of insulating portions arranged on both sides of the first conductive portion $P_1$, and a second conductive portion $P_2$ disposed on the outer side of the pair of insulating portions.

That is, as shown in FIG. 12a, a pair of insulating portions is formed near both side edges of the power supply plate for the press operation, such that the surface of the power supply plate for the press operation is divided into three parts by the insulating portions. The positions of the insulating portions may be appropriately changed according to the type of the MEA or GDL-MEA to be heat-treated. The positions of the insulating portions are restricted to the position of an object to be heat-treated.

In this structure, the upper and lower sides of FIG. 12a, that is, the second conductive portions $P_2$ near both side edges of the area defined by the insulating portions, are used for heat treatment of the electrode portion 102 as shown in FIG. 4. That is, as shown in FIG. 4, since heat generated when current flows to the conductor of the electrode portion during heat treatment of the electrode portion is used, the power supply plates at both sides are configured as the (+) and (−) electrodes.

On the other hand, the first conductive portion $P_1$ arranged at the center and defined by the insulating portions may be subjected to heat treatment performed by applying power to the entire central portion as shown in FIG. 6 or 8.

Therefore, as the power supply plate for the press operation is configured in the above-described manner, different powers are applied through the first conductive portion $P_1$ and the second conductive portion $P_2$. Thereby, different portions of the MEA or GDL-MEA can be heat-treated.

The manufacturing apparatus according to this embodiment further includes one or more buffer rollers 203, 204 that are movable so as to maintain the tension in the feeder during the press operation. That is, the buffer rollers 203 and 204 rotate even when the press operation is performed. Accordingly, the buffer rollers 203 and 204 move in order to prevent the membrane electrode assembly or the like from moving during the press operation such that the tension in the feeder is kept constant.

In addition, a cutter for cutting the MEA or the assembly of the MEA and the GDL heat-treated by the electric conductive press 206 into a predetermined size may be additionally provided. The cutter may be installed in place of the winding roller 202 of FIG. 10, and may provide an MEA in a cut form close to the final product form, rather than to a roll-shaped MEA intermediate material.

A transfer unit for moving the MEA cut by the cutter or the assembly of the cut MEA and the GDL may be provided. The transfer unit may be a robotic arm, as shown in FIG. 11, and is preferably used to transfer the MEA cut by the cutter to the apparatus of FIG. 11.

The apparatus of FIG. 11 may be used in series with or independently of the apparatus of FIG. 10, and include the same electrical conduction press 304 and power supply 303 for supplying power to the power supply plate P as shown in FIG. 10. That is, the sheet type manufacturing apparatus according to FIG. 11 may be installed to independently perform heat treatment of the MEA or GDL-MEA, and in some cases, may be used in combination with the apparatus of FIG. 10.

The sheet type manufacturing apparatus shown in FIG. 11 may include a supply-side transfer robot arm 301 for supplying the MEA or GDL-MEA to the electrical conduction press 304, and another transfer robot arm 302 for collecting the heat-treated MEA or GDL-MEA. The transfer robot arm 301, 302 may include a suction holder for holding objects to be transferred, such as the MEA, through suction.

For example, as shown in FIG. 11, an object to be heat-treated, that is, an object to be supplied to the electrical conduction press 304 is moved to the electrical conduction press 206 by the transfer robot arm on the supply side, and is then subjected to heat treatment by the electrical conduction press 304. Thereafter, the heat-treated object is transferred by the other transfer robot arm to collect the heat-treated MEA or GDL-MEA.

As is apparent from the above description, according to exemplary embodiments of the present disclosure, since heat treatment can be performed on each of the internal constituents of a membrane electrode assembly under heat treatment conditions set according to the internal constituents of the membrane electrode assembly, durability of the membrane electrode assembly may be improved, and performance degradation caused by deterioration thereof which may occur during heat treatment may be prevented.

According to embodiments of the present disclosure, as heat treatment processes with different conditions are allowed to be simultaneously performed in the press process, production time and cost of the membrane electrode assembly may be reduced, and thus, productivity may be improved.

The invention has been described in detail with reference to embodiments thereof. However, it will be appreciated by those skilled in the art that changes may be made in these embodiments without departing from the principles and spirit of the invention, the scope of which is defined in the appended claims and their equivalents.

What is claimed is:

1. A heat treatment method for a membrane electrode assembly (MEA) of a fuel cell, the heat treatment method comprising:
   placing a power supply plate on a surface of the MEA or on a surface of an assembly of the MEA and a gas diffusion layer (GDL); and
   performing heat treatment on the surface or an interior of the MEA, or on the surface or an interior of the assembly of the MEA and the GDL, by applying electric power to the surface or the interior of the MEA or to the surface or the interior of the assembly of the MEA and the GDL through the power supply plate.

2. The heat treatment method of claim 1, wherein the power supply plate is disposed on the MEA and heat treatment is performed on an electrode portion of the MEA by applying a direct current (DC) power or a DC pulse power to the MEA.

3. The heat treatment method of claim 1, wherein the power supply plate is disposed on the MEA and heat treatment is performed on an electrolyte membrane of the MEA by applying an alternating current (AC) power to the MEA.

4. The heat treatment method of claim 1, wherein the power supply plate is disposed on the assembly of the MEA and the GDL and heat treatment is performed on an interface between the MEA and the GDL by applying an alternating current (AC) pulse power to the assembly of the MEA and the GDL.

5. The heat treatment method of claim 1, wherein the power supply plate is for a press operation and applies the power to the surface of the MEA or the assembly of the MEA and the GDL while pressing the surface.

6. The heat treatment method of claim 1, wherein the power supply plate comprises a first conductive portion arranged at a center of the power supply plate, a pair of insulating portions arranged on both sides of the first conductive portion, and a second conductive portion disposed on an outer side of the pair of insulating portions, and
   wherein the first conductive portion and the second conductive portion are configured to apply different kinds of power to perform heat treatment at different positions.

7. The heat treatment method of claim 6, wherein the heat treatment is performed on one of an electrode portion of the MEA, an electrolyte membrane, and an interface between the GDL and the MEA by the power applied through the first conductive portion, and
   wherein the heat treatment is performed on one of the electrode portion, the electrolyte membrane, and the interface by the power applied through the second conductive portion, except for the one subjected to the heat treatment by the power applied through the first conductive portion.

8. The heat treatment method of claim 3, wherein a frequency of the AC power is set to be equal to a resonance frequency of the electrolyte membrane.

9. The heat treatment method of claim 4, wherein an electric charge supplied from one pulse applied by the AC pulse power is set to be smaller than or equal to a capacitance of the MEA.

* * * * *